Jan. 12, 1926.
C. GORE
1,569,223
VEHICLE SPEED INDICATOR
Filed July 22, 1922
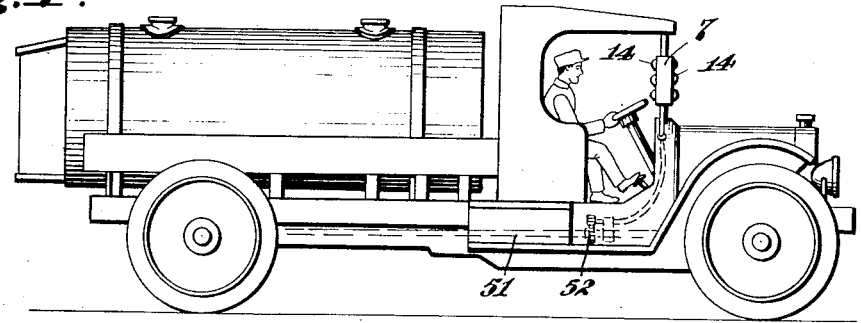
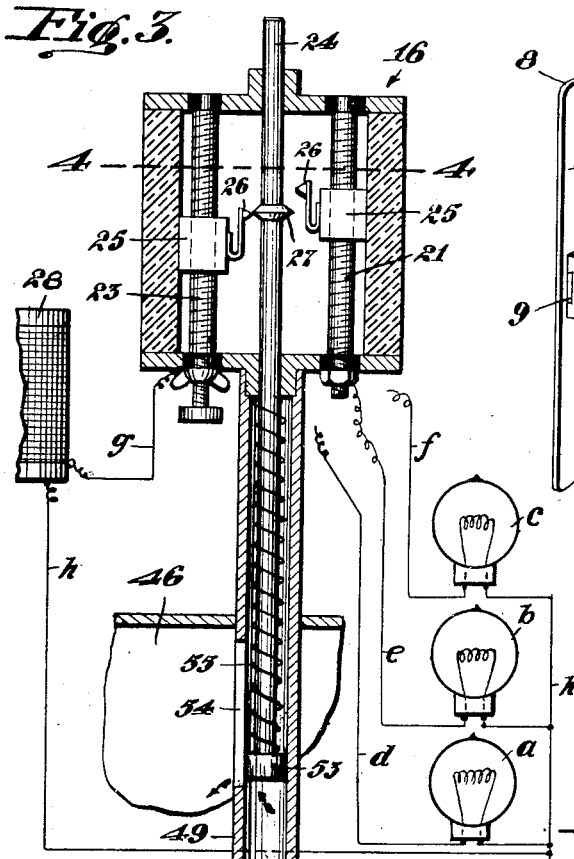
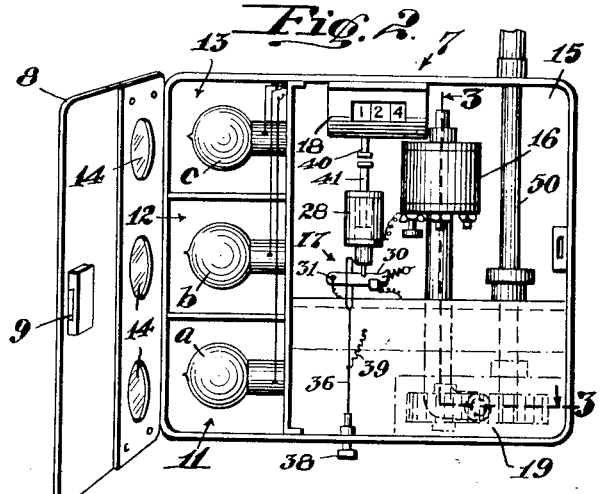
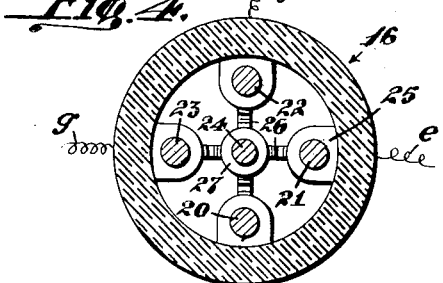
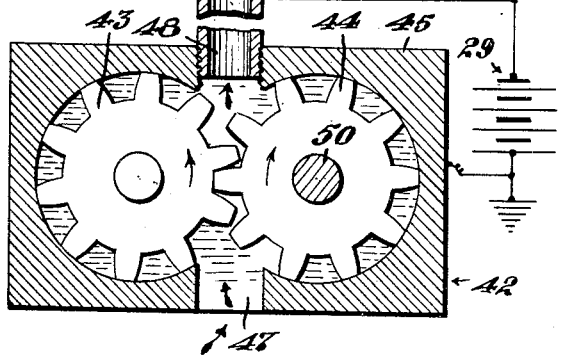
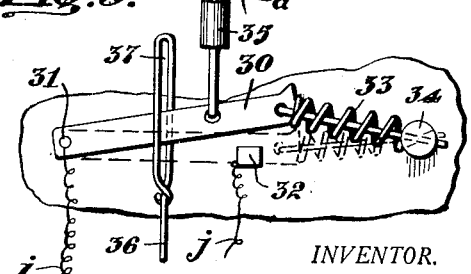
INVENTOR.
CHARLES GORE
BY
R. S. Berry
ATTORNEY.

Patented Jan. 12, 1926.

1,569,223

UNITED STATES PATENT OFFICE.

CHARLES GORE, OF LOS ANGELES, CALIFORNIA.

VEHICLE SPEED INDICATOR.

Application filed July 22, 1922. Serial No. 576,835.

*To all whom it may concern:*

Be it known that I, CHARLES GORE, a subject of the King of England, residing at Los Angeles, in the county of Los Angeles and State of California, have invented new and useful Improvements in Vehicle Speed Indicators, of which the following is a specification.

My invention relates to a device for indicating predetermined speeds of a vehicle of the character described in my co-pending application for United States Letters Patent, filed October 18, 1922, Serial No. 595,432, and application filed July 24, 1922, Ser. No. 577,070, and an object thereof is to provide a means whereby the driver of a vehicle may be warned when the rate of travel of the vehicle reaches a certain speed so that the driver may guard against exceeding speed limits. Another object is to provide an effective means for operating the speed indicator from some rotating part of the vehicle driving mechanism or running gear. Another object is to provide a means for arresting operation of the vehicle by automatically shutting off the motor when the rate of travel of the vehicle reaches a predetermined speed, and to provide means for manually operating the speed arrester to reset it after an automatic operation thereof to again permit operation of the motor. A further object is to provide means for registering each automatic operation of the speed arrester so that a record may be had of the number of times at which the vehicle has been driven to the predetermined speed limit.

With the foregoing objects in view together with such other objects and advantages as may subsequently appear, my invention resides in the parts and in the construction, arrangement and combination of parts hereinafter described and claimed and illustrated in the accompanying drawings in which;

Figure 1 is a view in side elevation of a motor truck showing the invention as applied.

Fig. 2 is a view in elevation of the speed indicator and arrester.

Fig. 3 is a detail view in section as seen on the line 3—3 of Fig. 2 showing the electrical devices in diagram.

Fig. 4 is a view in section as seen on the line 4—4 of Fig. 3.

Fig. 5 is a detail in elevation of the circuit breaker.

More specifically 7 indicates a casing of any suitable construction adapted to be mounted at any convenient point on a vehicle and here shown in the form of a box one side of which is fitted with a hinged door 8 provided with a lock 9 by which the door may be fastened in a closed position. The housing is provided with a plurality of compartments 11, 12 and 13 in which are arranged electric lamps $a$, $b$, and $c$. and formed in the door 8 and in the back wall of the casing are windows 14 to expose the lamps $a$, $b$, and $c$. The lamps or the windows may be colored so that on illumination of each lamp a different colored light will be observed, such for example, yellow, green, and red lights, for the lamps $a$, $b$, and $c$ respectively. The casing is formed with a fourth compartment 15 in which is arranged a multiple switch 16 for controlling illumination of the lamps, a circuit breaking switch 17 controlling the ignition circuit of the vehicle motor, a register 18 for indicating operations of the switch 17, and speed controlled mechanism 19 for operating the multiple switch 16.

The multiple switch 16 embodies a housing in which is mounted a plurality of threaded stems 20, 21, 22 and 23, each of which is insulated from the housing and is turnable in suitable bearings. Extending centrally into the housing is a reciprocal bar 24 arranged parallel to the turnable stems 20, 21, 22, and 23; the turnable stems being arranged equal distances apart around the reciprocal bar and spaced therefrom. Mounted on each of the turnable stems in screw engagement therewith is a sleeve 25 having a substantially flat side abutting against the inner wall of the housing whereby the sleeve will be held against turning so that on rotating the turnable stem the sleeve may be caused to move longitudinally of the stem by reason of the screw threaded engagement between the sleeve and stem. Mounted on each sleeve 25 is a spring wiper contact member 26 which extends toward the reciprocal bar and is adapted to electrically contact a wiper flange 27 formed on the bar 24. The wiper contact members are designed to be spaced at suitable intervals apart lengthwise of the bar 24 in such fashion that as the bar advances it will effect electrical connection successively with each of the contacts 26.

Stem 20 connects with a conductor $d$ leading to one side of lamp $a$; stem 21 connects with a conductor $e$, leading to one side of lamp $b$; stem 22 connects with a conductor $f$ leading to one side of lamp $c$; and stem 23 connects with a conductor $g$ leading to one side of a solenoid magnet 28. The other terminals of the lamps and the magnet connect with a conductor $h$ leading to one side of a battery 29, the other side of which connects with the bar 24 through a ground.

The switch 17 embodies an arm 30 pivoted at 31 and adapted to be moved in and out of engagement with a contact member 32 to make and break a circuit through conductors $i$ and $j$ of the ignition circuit for operating the vehicle motor. The switch arm 30 is designed to be held in either its open or closed position by a spring 33 which bears between a post 34 and the outer end of the switch arm in such manner as to hold the latter on either side of a central position. The switch arm 30 is connected to the core 35 of the magnet 28 which magnet is designed on being energized to lift the switch arm out of engagement with the contact member 32 and thereby break the ignition circuit to stop the motor.

As a means for closing the switch arm 30 from the exterior of the housing a pull rod 36 is provided, which rod is formed with a slot 37 through which the switch arm extends. The rod 36 projects through the bottom of the housing 7 and has a handhold 38 on its outer end. A spring 39 has one end connected to the rod 36 and its other end connected to the casing and is designed to maintain the rod 36 in its uppermost position. The slot 37 in the push rod is of such length as to permit movement of the switch arm to its open position.

The register 18 is constructed in the manner common in devices of this character, and embodies a push pin 40 adapted to be operated by movement of the switch arm 30 in one direction, being here shown as actuated by an extension 41 on the core 35 which extension is adapted to depress the push pin 40 on energization of magnet 28.

An important feature of the present invention resides in a means for operating the reciprocal bar 24 which means embodies a hydraulic governor here shown as including a pump 42 having intermeshing spur gears 43 and 44 enclosed in a housing 45 arranged in a fluid containing chamber 46; the housing having a fluid inlet 47 on one side and an outlet 48 on the other side arranged so that on rotation of the gears in one direction fluid will be caused to pass from the outlet into a tube 49. One of the gears is mounted on a shaft 50 which is driven by some rotary part of the vehicle driving mechanism or running gear affected by movement of the vehicle, being shown as geared to the torsion shaft 51 by gearing 52. The tube 49 connects at one end with the pump housing 45 and at the other end with the housing of the switch 16. The slide bar 24 extends into the tube 49 and has a piston 53 on its outer end on which the liquid entering the tube from the pump acts to move the bar upwardly in the switch housing. A slot 54 is formed longitudinally of the tube and opens to the chamber 46 through which the liquid is discharged from the tube, this slot being so arranged that the piston will vary the extent of opening thereof as the piston moves up or down in the tube according to variation of pressure of the liquid under action of the pump. A spring 55 encircles the bar in the tube and acts to yieldably oppose upward movement of the bar and to move the bar downwardly on reduction of pressure of the fluid. The bar is thus moved upwardly under fluid action and downwardly under spring action.

In the operation of the invention, the sleeves 25 are arranged on the stems 20, 21 and 22 at successively stepped up planes so as to dispose the contacts 26 at different levels according to the points at which it is desired to make contact with the rod 24 as the latter is advanced, it being understood that the rod will move upwardly according to the pressure of liquid thereon effected by the pump and which pressure is varied according to the speed of the vehicle. For example assume it is desired to signal when the vehicle is traveling at speeds of ten, fifteen and twenty miles. The contact 26 on stem 20 would then be positioned to be engaged with the contact 27 when the bar has been moved upwardly by the action effected by the pump when the vehicle is traveling at the rate of ten miles per hour and in like manner the contacts 26 on the stems 21 and 22 are set to engage the contact 27 on the bar when the latter has been advanced by the action of the pump when the speed of the vehicle is increased to fifteen and twenty miles per hour. It will now be seen that when the speed of the vehicle reaches either of the predetermined speeds as indicated in the example the lamps $a$, $b$, and $c$, will be successively illuminated thus giving warning of the speed of travel of the vehicle at a plurality of speeds.

The contact 26 on the stem 23 is set to effect contact with the bar and complete a circuit through the magnet 28 at the moment when the vehicle reaches a speed of travel at which it is desired to automatically shut off the engine, which may be at any point within the range of the speed of the vehicle, whereupon in event the vehicle is driven up to the predetermined speed limit the magnet will be energized and the switch arm 30 will be lifted out of engagement with the contact member 32 thereby breaking the circuit through the conductors $i$ and $j$ and stopping the motor as is common in internal combustion engine operations. In practice, the contact 26 controlling the magnet is positioned slightly above one of the contacts controlling a lamp so that illumination of the lamp will occur before operation of the magnet will take place thus cautioning the driver against increasing the speed of the vehicle to the speed limit. The contact 26 may obviously be set to interrupt the ignition circuit after illumination of either one of the indicating lamps, as occasion may require, but ordinarily would be disposed so as to have all the lamp circuits closed before the interruption of the ignition circuit takes place. The signal lamps thus cooperate with the automatic motor stop in enabling the driver to keep the vehicle within a certain speed.

In event the vehicle is driven at such speed as to cause the motor controlling switch to be opened the register 18 will be operated to record the fact, thus enabling the determination of the number of times that the vehicle has been driven up to the predetermined speed. After the switch arm 30 has been opened it may be restored by pulling down the rod 36 without opening the casing.

The invention is particularly suitable for use on motor driven trucks so as to prevent the truck from being driven at excess speeds, and to enable persons having charge of trucks to determine whether the truck has been driven at excess speed on certain runs, as well as to indicate to the driver and others to whom the signal is visible the moment when the vehicle is traveling at a certain speed.

I claim:

1. In a device for indicating and controlling speeds of vehicles, a liquid-containing chamber, a pump having an inlet communicating with said chamber, a tube leading from the outlet of said pump having a side opening communicating with said chamber, a spring pressed reciprocal bar extending longitudinally into said tube, a piston on said bar, a wiper contact on said bar, means for driving said bar by propulsion of a vehicle whereby liquid will be forced against the piston in the tube to effect upward movement of the bar, said piston in moving upward uncovering the opening in said tube whereby liquid may pass from the tube to the chamber, and means controlled by the wiper contact for signaling when the vehicle has reached a predetermined speed.

2. In a device for indicating and controlling speeds of vehicles, a liquid-containing chamber, a pump having an inlet communicating with said chamber, a tube leading from the outlet of said pump having a side opening communicating with said chamber, a spring pressed reciprocal bar extending longitudinally into said tube, a piston on said bar, a wiper contact member on said bar, means for driving said bar by propulsion of a vehicle whereby liquid will be forced against the piston in the tube to effect upward movement of the bar, said piston in moving upward uncovering the opening in said tube whereby liquid may pass from the tube to the chamber, means controlled by the wiper contact for signaling when the vehicle has reached a predetermined speed, an ignition circuit switch, and means adjustable relative to said last named means for opening said ignition circuit switch.

3. In a device for indicating and controlling speeds of vehicles, a liquid containing chamber, a pump having an inlet communicating with said chamber, a tube leading from the outlet of said pump having a side opening communicating with said chamber, a spring pressed reciprocal bar extending longitudinally into said tube, a piston on said bar, a wiper contact member on said bar, means for driving said bar by propulsion of a vehicle whereby liquid will be forced against the piston in the tube to effect upward movement of the bar, said piston in moving upward uncovering the opening in said tube whereby liquid may pass from the tube to the chamber, means controlled by the wiper contact for signaling when the vehicle has reached a predetermined speed, an ignition circuit switch, means adjustable relative to said last named means for opening said ignition circuit switch, and means operable to maintain said switch open until manually closed.

CHARLES GORE.